United States Patent [19]

Ratcliffe

[11] Patent Number: 5,864,563
[45] Date of Patent: Jan. 26, 1999

[54] METHOD FOR TESTING NETWORK

[75] Inventor: Mark A. Ratcliffe, Oakhurst, N.J.

[73] Assignee: AT&T Corp, Middletown, N.J.

[21] Appl. No.: 680,767

[22] Filed: Jul. 15, 1996

[51] Int. Cl.[6] .............................. G01R 31/28; G06F 11/00
[52] U.S. Cl. .................................... 371/20.1; 395/182.08; 395/183.01
[58] Field of Search ................................. 371/20.1, 20.3; 379/201, 207, 219, 220, 221, 26, 29, 37, 38, 39; 340/825.05, 825.06, 364; 364/551.01, 550, 514; 395/183.01, 185.01, 185.08, 185.09, 182.08, 182.02

[56] References Cited

U.S. PATENT DOCUMENTS

| | | | |
|---|---|---|---|
| 5,278,823 | 1/1994 | Handel | 370/249 |
| 5,359,646 | 10/1994 | Johnson et al. | 379/27 |
| 5,566,235 | 10/1996 | Hetz | 379/220 |
| 5,570,420 | 10/1996 | Bress et al. | 379/220 |
| 5,586,177 | 12/1996 | Farris et al. | 379/220 |
| 5,627,766 | 5/1997 | Beaven | 364/551.01 |

*Primary Examiner*—Trinh L. Tu

[57] ABSTRACT

In order to test provisioned data and functionality of a network, the operations personnel input data via an operations interface to an originating network element. The originating network element constructs a test query based on the data and selects a receiving network element to be tested. When the originating network element sends the test query to the receiving network element, the test query is processed as if it is a normal network query. A response to the test query is returned to the originating network element and reported to the operations personnel. The reported response contains not only the test results of the provisioned data in the receiving network element but also the routing functionality of the network.

33 Claims, 13 Drawing Sheets

METHOD FOR TESTING NETWORK

BACKGROUND OF THE INVENTION

This invention relates to a method for testing a communication network. More particularly, the invention relates to a method for testing network application's call processing and routing of network queries and responses.

In the early 1980's, centralized databases called network control points (NCP) were introduced into signaling networks by AT&T to support the credit card calling service and 800 service. The network architecture with these network control points allowed intelligent network services for providing call handling information in response to network queries.

The network control points for the 800 service, for example, are deployed throughout the United States to support the Data Base 800 Service mandated by the Federal Communication Commission. In the network architecture for such 800 service, 800-number calls are routed from a local router or end office to a network switch which launches network queries to the network control point. The network control point translates the 800 number to a plain old telephone number and returns the plain old telephone number to the network switch. The network switch subsequently routes the call to an appropriate network carrier based on this plain old telephone number.

The network control points are designed to accommodate growth and additional services other than 800 and calling card services. For example, the network control points are designed as high-capacity systems handling more than one million queries per hour. Further, modifications for additional service enhancements may be carried out without interrupting existing services by loading the new software programs into the network control points, without service interruption. In fact, alternate billing services (ABS) such as a collect calling service and a bill-to-third-number calling service have been implemented using the network control point architecture.

With an increasing number of communication services introduced into the network and increasingly sophisticated services, developing a test to insure that these network facilities with newly installed software programs function in an anticipated manner is a critically important task.

Many types of test simulators are known in order to satisfy the needs of testing a network. Most such systems employ hardware that has been programmed to emulate actions and responses of network elements. However, due to increasing complexity of the network and more sophisticated software, developing simulators with the hardware resembling the actual network has become a costly and difficult task.

Further, there are many types of test querying methods available for a network test. However, these test methods require either special processing for the test queries or additional hardware to process test queries which adds significant burden to the already complex network architecture.

Therefore, it is desirable that network testing does not require neither additional hardware nor data structures built specifically for the test query capability. It is also desirable that network elements or service processors do not need to reprogrammed to perform special application processing for the test queries.

It is also desirable that actual hardware and software of the network are tested so that problems associated with the actual routing data as well as provisioned data located in the network elements are identified.

It is therefore an object of this invention to provide a useful network testing method to the operations personnel to verify and troubleshoot processing and routing functions of the network applications without prompting needs for special hardware or processing.

SUMMARY OF THE INVENTION

These and other objects of the invention are accomplished in accordance with the principles of the invention by providing a test query designed to test the provisioned data and functionality of a network. The test query is generally formed at an originating network element with the information received from the operations personnel. The test query is then routed to a receiving network element selected for testing. The receiving network element processes the test query as an actual network query and returns a response to the test query to the originating network element. In this testing process, both provisioned data in the receiving network element as well as the processing of the network query and response are tested.

The processing of the test query at the receiving network may prompt queries to another network element such as a service processor. In such a case, the receiving network element creates and sends out another test query for testing the service processor. This second test query includes an identification code so that the originating network element upon the receipt of the response to the second test query can associate the response with the original test query. The service processor subsequently processes the second test query and sends the response to the originating network element.

In another aspect of the invention the receiving network element may be the same as the originating network element. In such case, the operations personnel may test the receiving network element by forming a pseudo test query so that the receiving network element processes the test query as if it is received from a geographically separated originating network element.

Further features of the invention, its nature and various advantages will be more apparent from the accompanying drawings and the following detailed description of the preferred embodiments.

DETAILED DESCRIPTION OF THE PREFERRED EMBODIMENTS

Figure 1A:
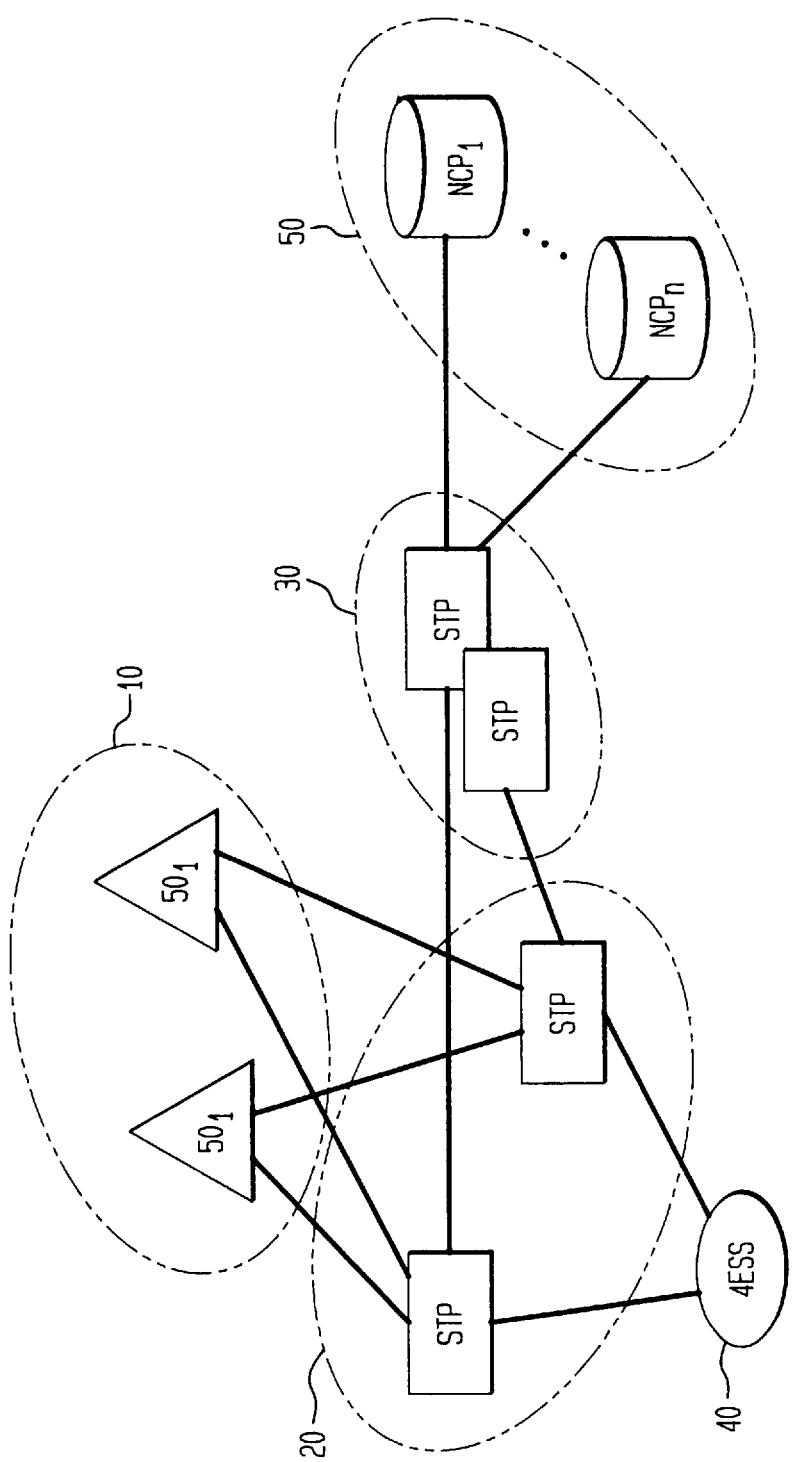
FIG. 1a is a general block diagram of an illustrative network which can be tested in accordance with this invention.

In the illustrative embodiment shown in FIG. 1a, a representative communication network that provides a test query capability is shown. As used in this application, a Segmentation Directory (SD) refers to a network element that is added to a conventional telecommunication network. The SD is used to locate service processors or network application processors (NCPs) which would perform intelligent network services, thus requiring testing of its service processing and provisioned data. A signal transfer point (STP) refers to a reliable and high-capacity packet switch for routing signaling messages between switches and databases. A network control point (NCP) refers to one type of service processor which is an on-line, real-time, and transaction-processing database for providing call-handling information in response to network queries.

The communication network of the present invention includes set of SD's 10, home region of STP's 20, remote region of STP's 30, switch 40, and set of NCP's 50. The communication links between these network elements are signaling system 7 (SS7) links that normally function at 56 kb/s in North America and at 64 kb/s in Europe. The SS7 links are capable of carrying messages to perform both trunk signaling among switches 40 and direct transaction signaling between switches 40 or SDs 10 and set of NCP's 50 via STP regions 20 and 30. Switch 40 may be a AT&T 4ESS® switch.

The home region of STP's 20 is a mated pair of STP's each containing the same data. The home region of STP's 20 is fully interconnected by SS7 links but geographically separated. This arrangement of redundancy is provided to prevent the loss of data in the event of a natural disaster at one site such as an earthquake, flood or fire or failure of an STP itself.

Similarly, the set of SD's 10 is also a mated pair of SD's designed to provide an alternative source of routing information if one SD fails. The set of SD's 10 replaces the function of various table lookups to identify the service and global translation of the current SS7 network. For example, the dialed number when looked up has a pointer to certain types of services and the service has a pointer to a certain service processor or database in the network. When incoming call information is received at the set of SD's 10, the dialed number, or the relevant piece of information, 30 is therefore used to determine which service processor to send a query to.

The set of NCP's 50 may contain more than one mated pair of NCP's with different contents. For example, the current technology cannot hold all 800 service telephone numbers in one database. The 800 service data, therefore, may be distributed over several NCP's. The set of NCP's 50, accordingly, may be portioned into different memory areas each allocated to a multiple of the 800 telephone numbers and related service data.

Figure 1B:
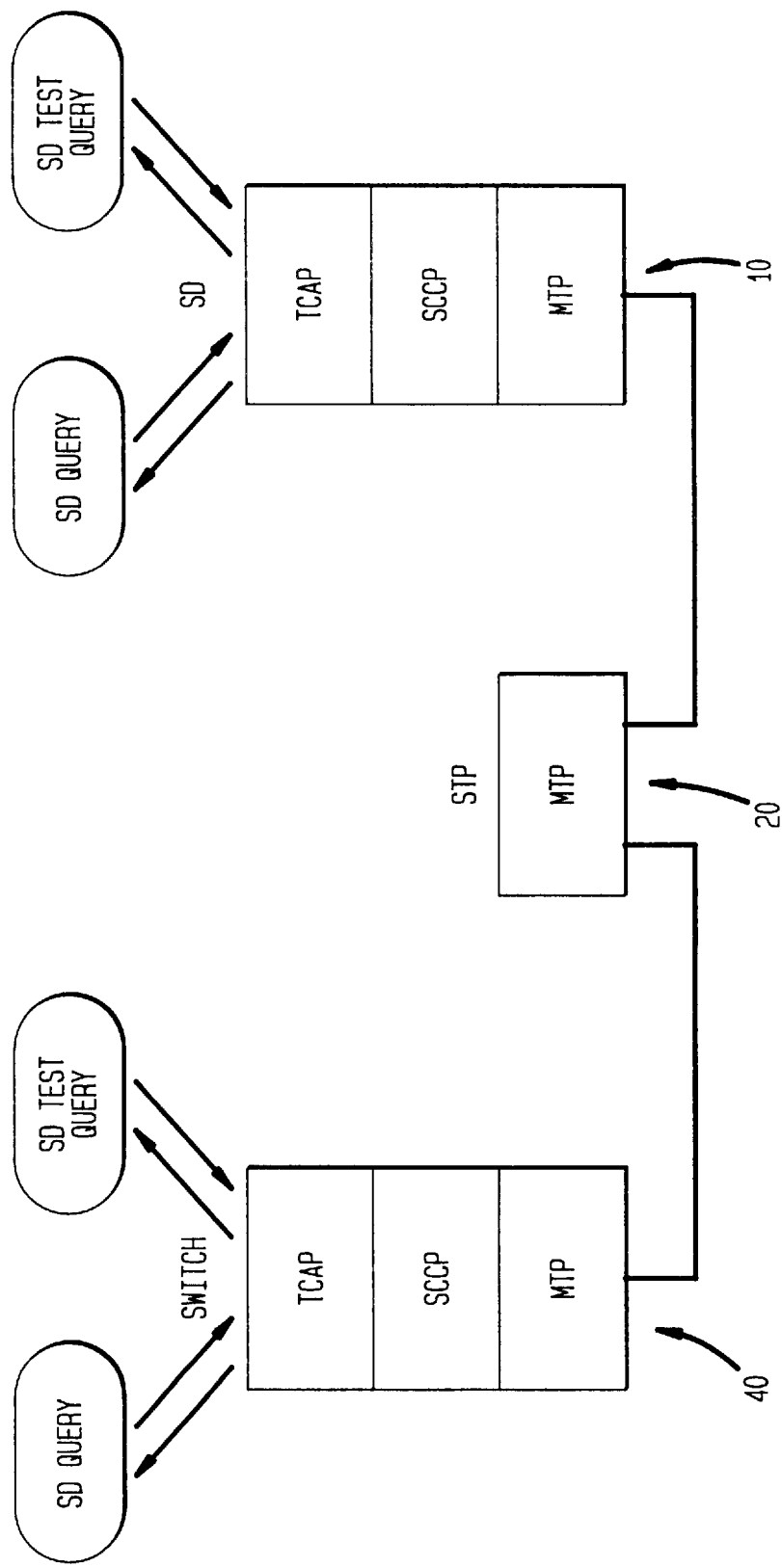
FIG. 1b is a simplified diagram of the illustrative open layers of communication protocols which are utilized to carry out the methods of this invention.

FIG. 1b shows a simplified diagram of an illustration of the open systems interconnections (OSI) architecture that would be useful in discussing the method of the present invention. Other similar protocols designed for communication-oriented processing software such as the international standards organization (OSI) reference model may be also used to illustrate the method of the present invention.

The OSI architecture provides a set of layers that are facilitated for communication between the end points, e.g. switch 40 and SD 10, via a node located between the end points, e.g. STD 20. The layers that are utilized at the end points, switch 40 and SD 10, are transaction capabilities application part (TCAP), signaling connection control part (SCCP), and message transfer part (MTP) layers. The layer that is utilized at a node, STD 20, is just the MTP layer.

The TCAP layer provides the functions that control non-circuit related information transfer between two or more signalling nodes via the signalling network. The SCCP layer provides connectionless network services to transfer non-circuit related information end-to-end. The MTP layer within itself includes a network layer, data link layer, and physical layer. The network layer provides the transport functions that are common to and independent of the operation of individual signalling links; the two categories of these functions are signalling message handling and signalling network management. The data link layer provides the functions and procedures relating to the transfer of messages over on individual signalling link. The physical layer provides electrical, functional, and procedural characteristics of a signalling data link.

In one exemplary embodiment of the present invention, a test query directed to SD 10 is created at switch 40. When this test query is sent out from switch 40, the SS7 network creates a message that has within itself the various components of the layered protocols of the MTP, SCCP, and TCAP.

In such case, switch 40 and SD 10 communicates logically at the TCAP level and also at the SCCP level. For example, the TCA level content of the message includes mandatory parameters such as a correlation ID, calling party address, and dialed number. The content may also include optional parameters such as a customized announcement capability, originating station type, and access information. The SCCP level content of the message includes a SCCP calling party address and SCCP called party address. Therefore, these parameters are transferred from switch 40 to SD 10 at the TCAP and SCCP levels to facilitate application processing.

At the MTP level, switch 40 communicates to STP 20 so as to route a SD query to SD 10. The destination point code, is the address of the network element used at the MTP level by STP 20 to choose a proper SS7 link set to route the message to proper SD 10.

The SD query, therefore, is really a normal application function used for transferring call related information at an application level by using the functions at lower levels to route its information.

Figure 2:
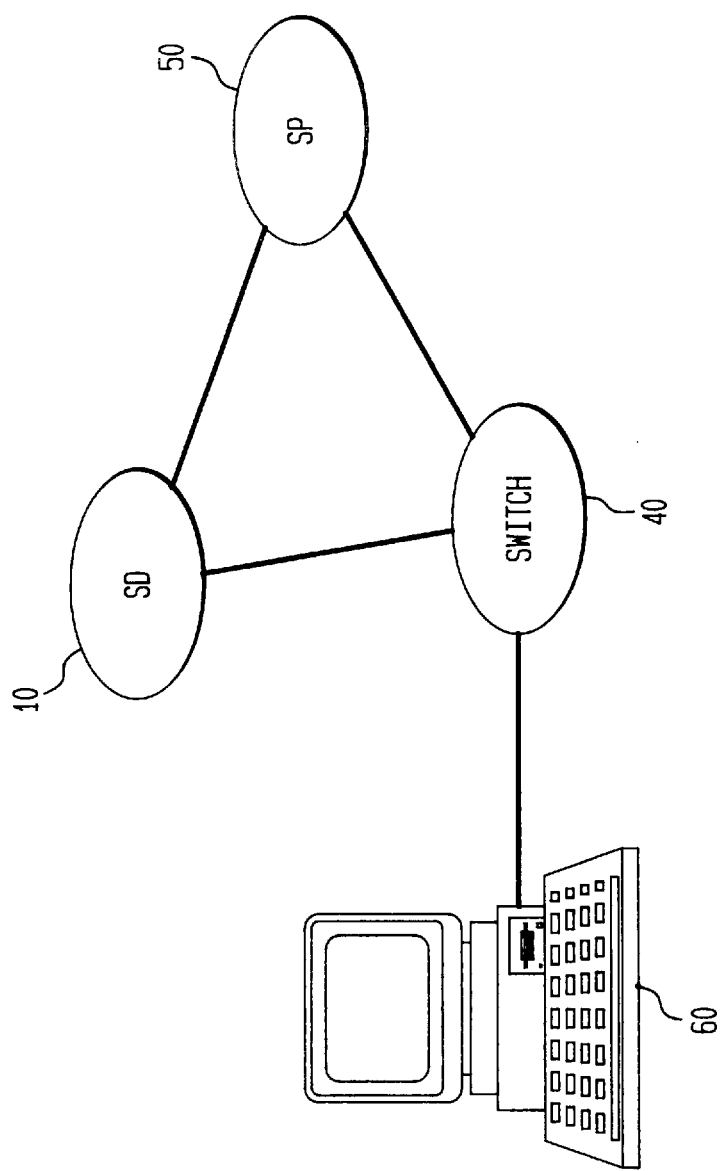
FIG. 2 is a simplified block diagram of the illustrative network of FIG. 1.

FIG. 2 shows a simplified block diagram of the illustrative network of FIG. 1 with operations interface (OI) 60 connected to switch 40. Operation interface 60 may be a processor or computer terminal provided for interactions between the network and the operations personnel who needs to test a network application. For example, the operations personnel access, via operations interface 20, switch 40 or SD 10 to test the routing and processing functions as well as the provisioned data related to the new application.

Figure 3A:
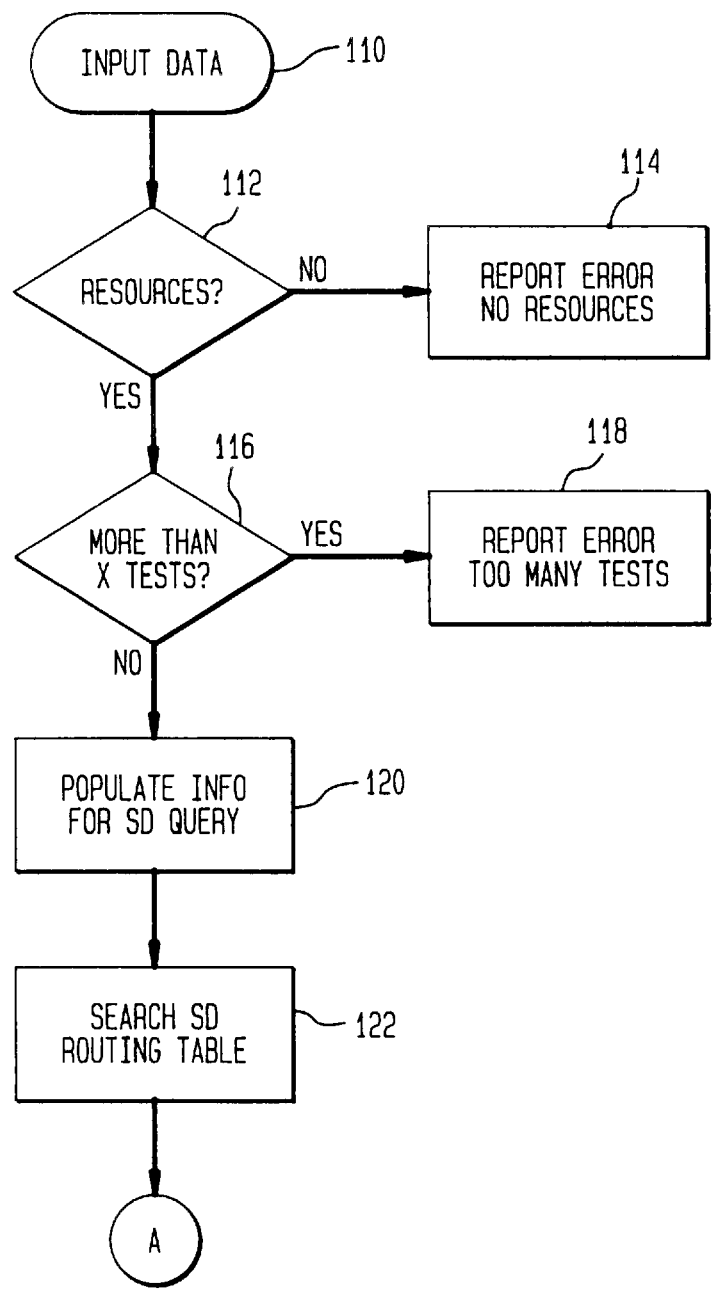
FIGS. 3a–b (collectively referred to as FIG. 3), 4a–b (collectively referred to as FIG. 4), and 5a–b (collectively referred to as FIG. 5) are a flow chart of steps for carrying out an illustrative embodiment of the methods of this invention.
Figure 3B:
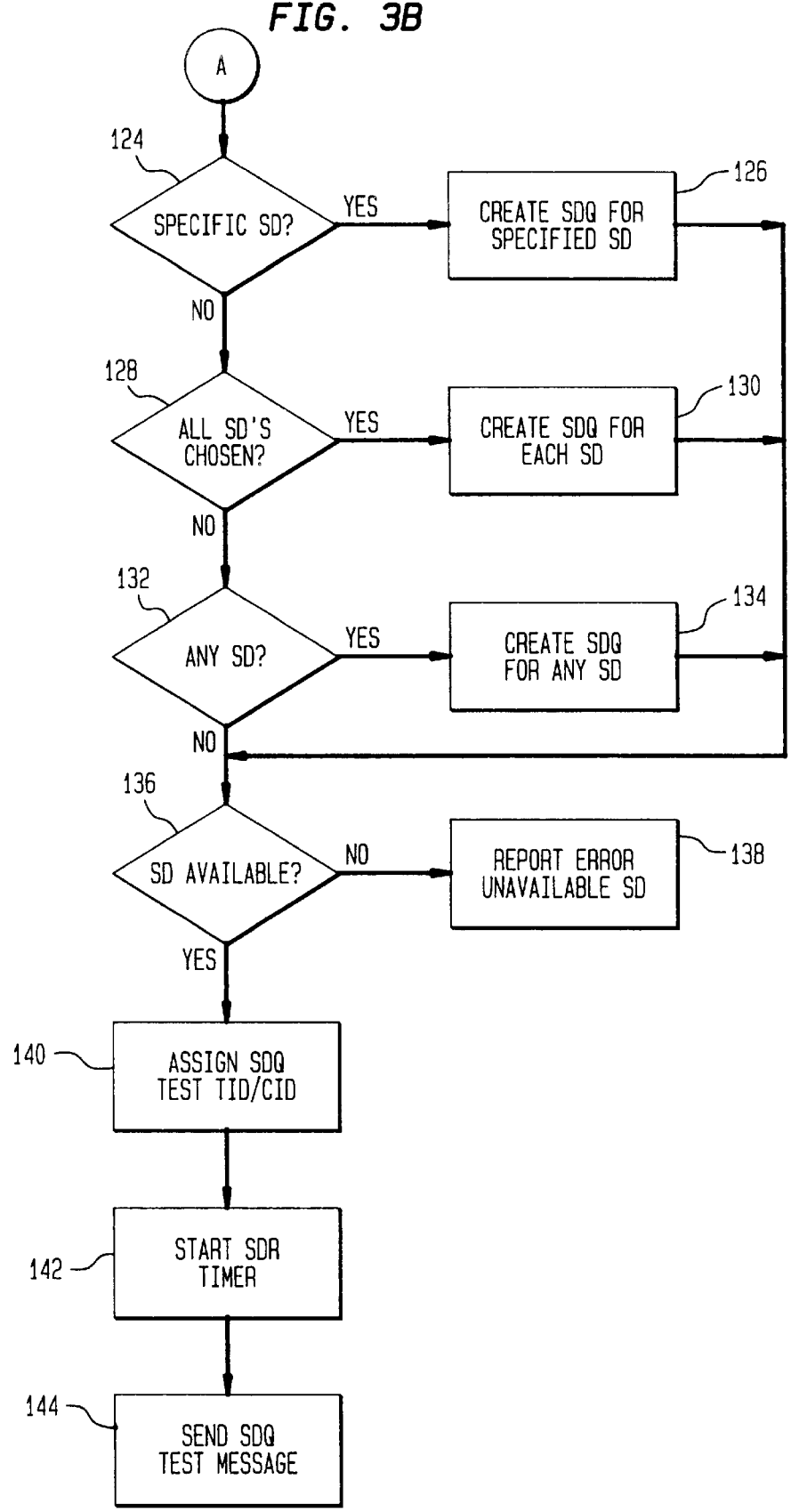
Figure 4A:
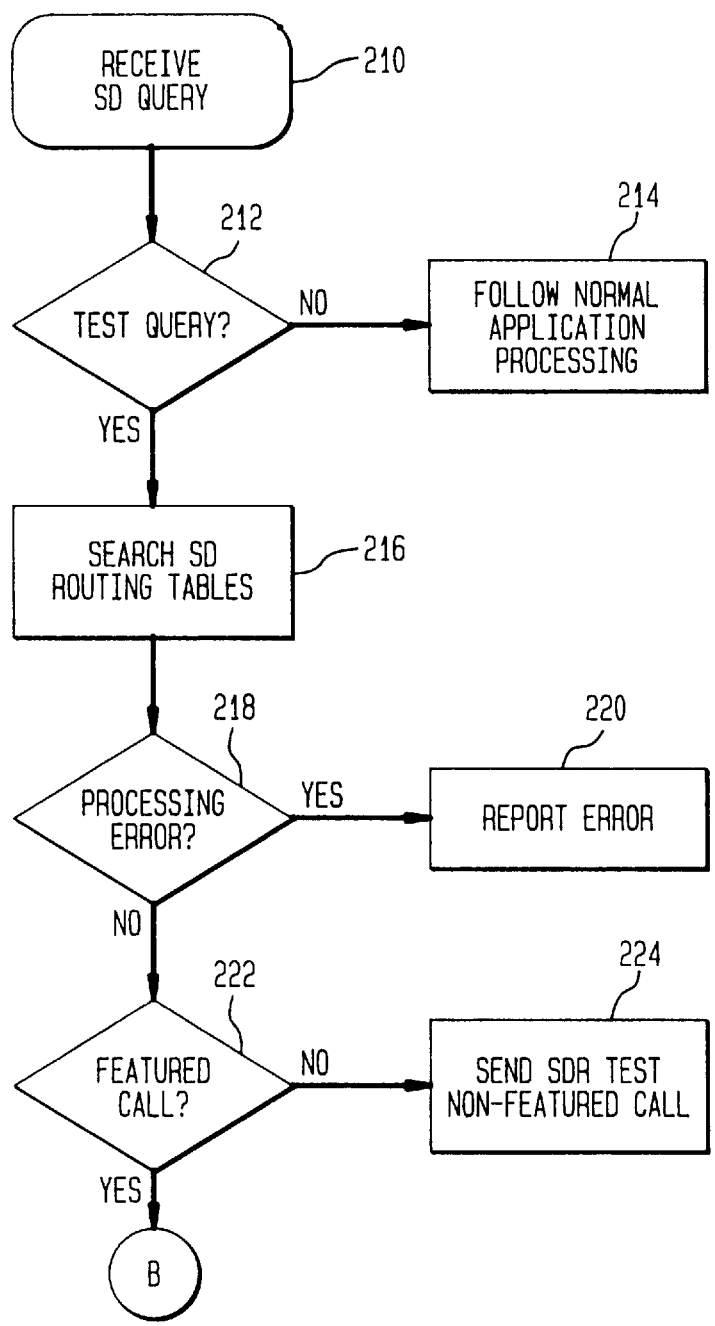
Figure 4B:
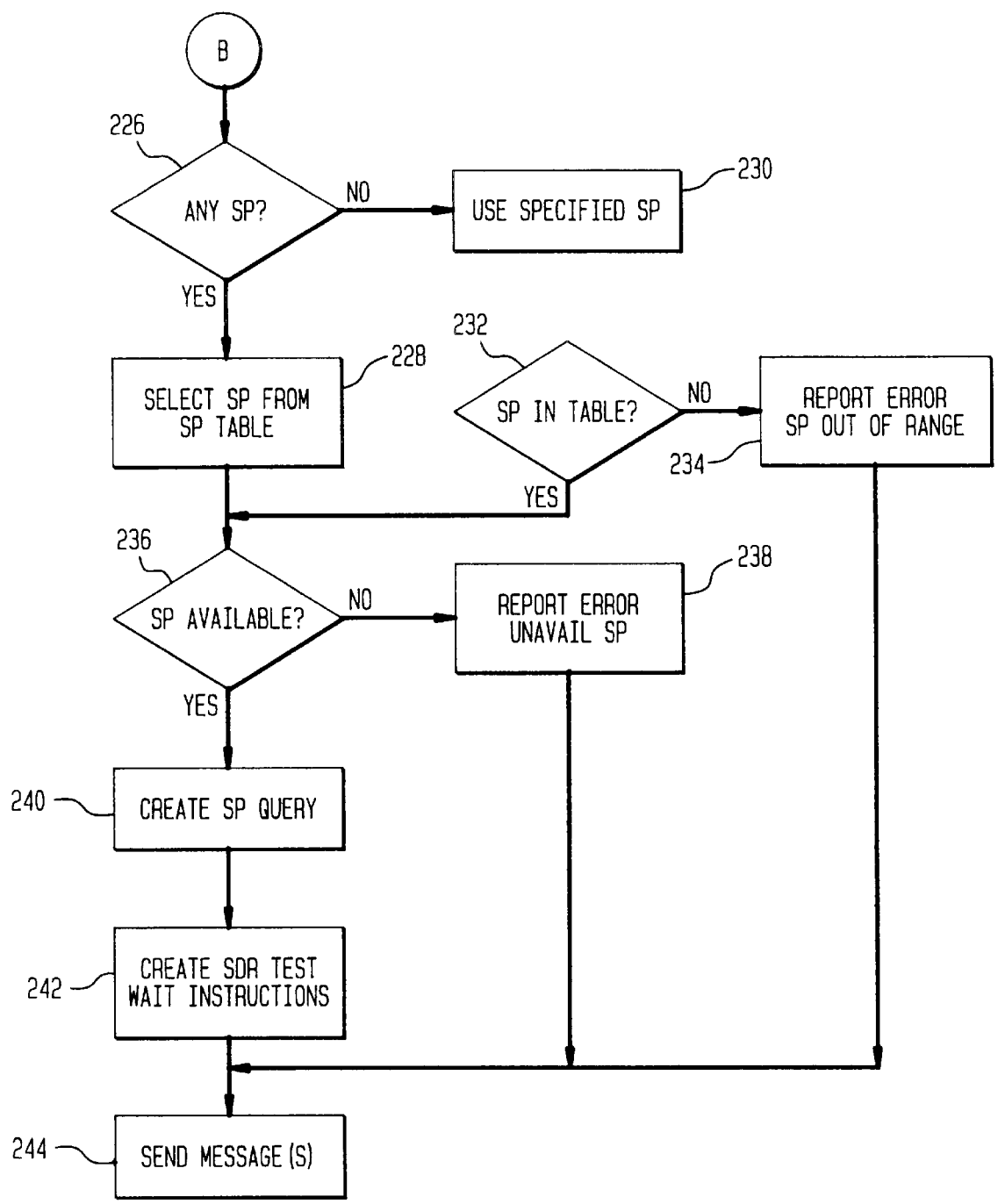
Figure 5A:
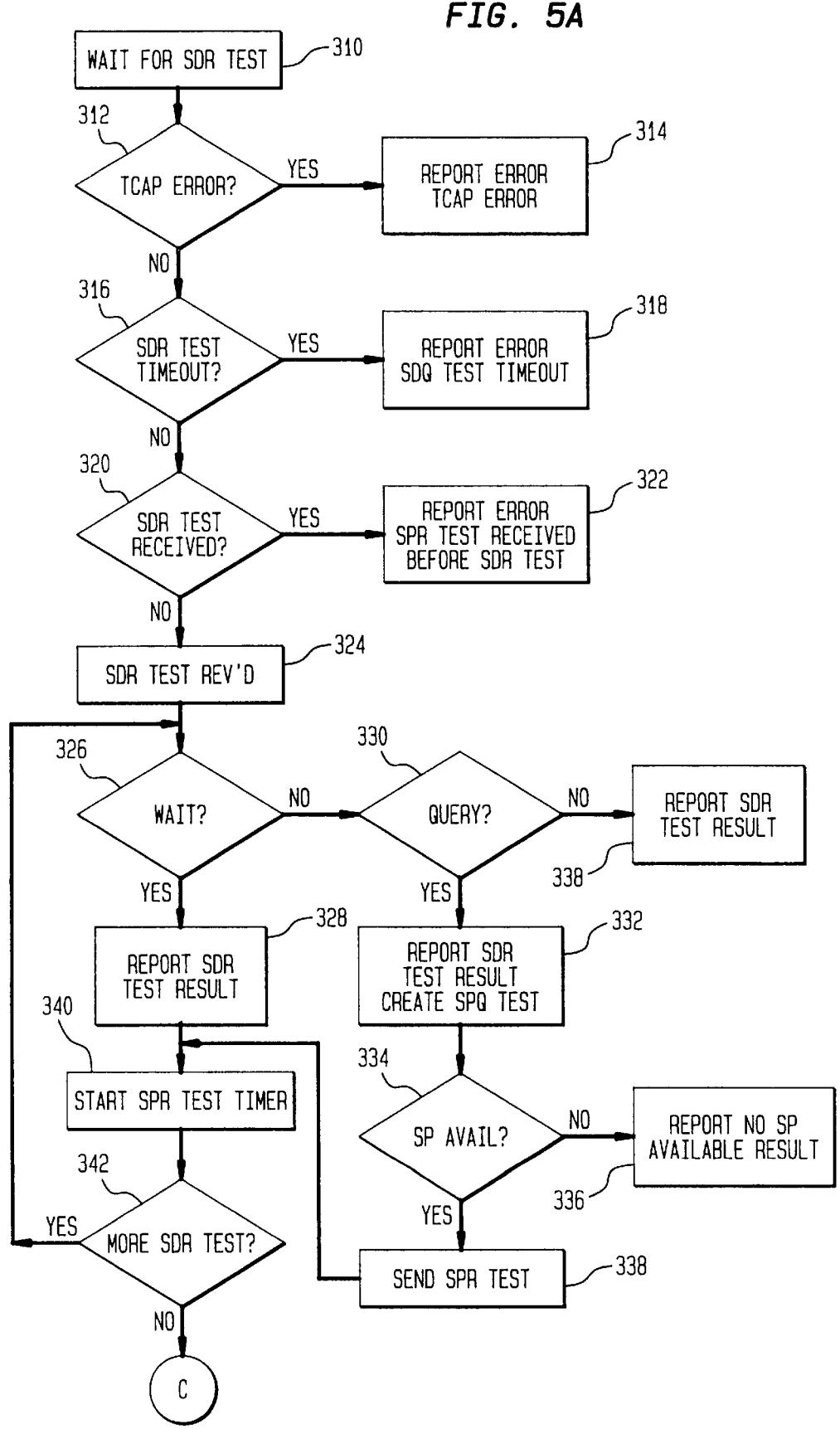
Figure 5B:
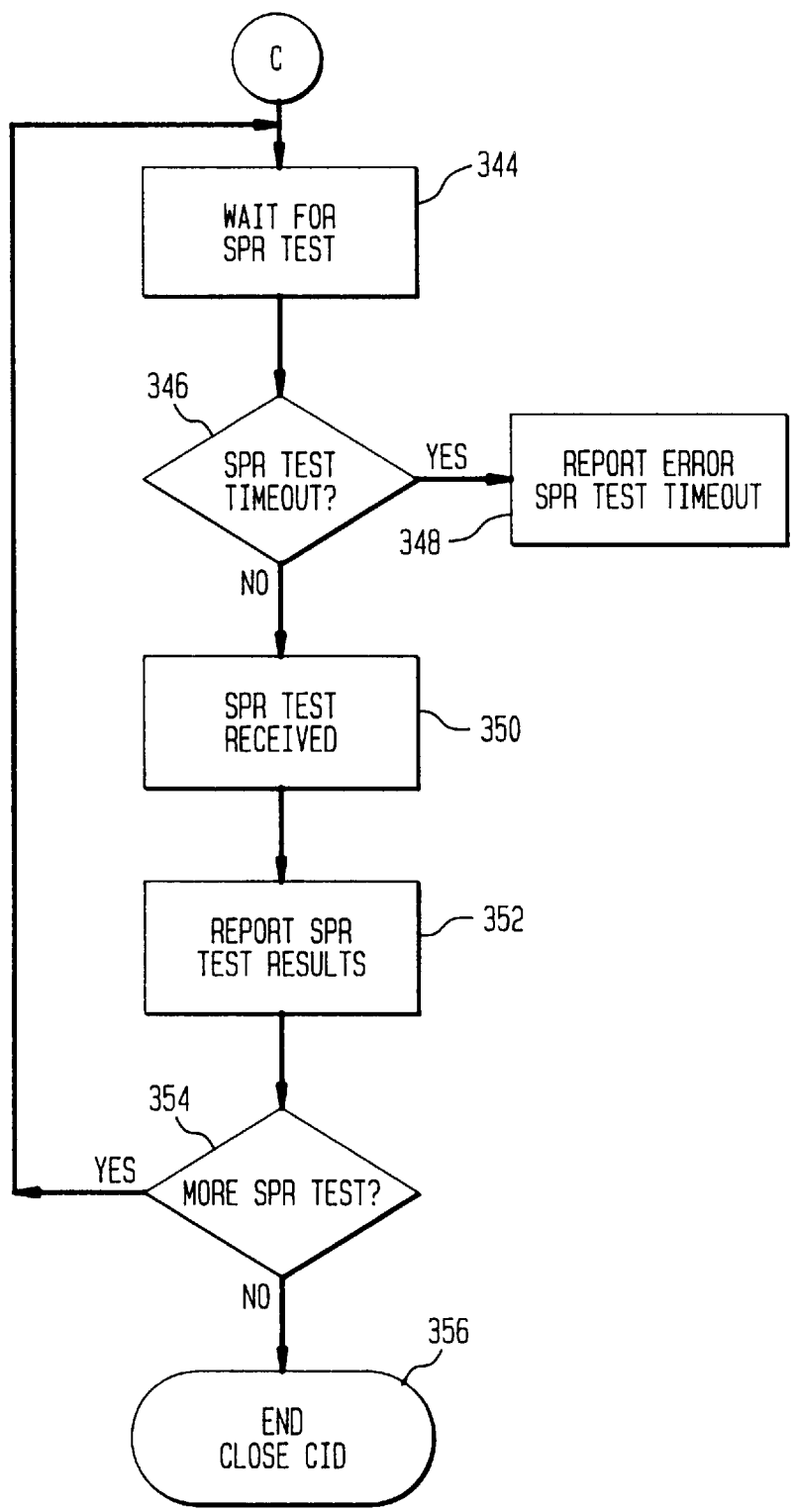

FIGS. 3, 4, and 5 show an illustrative sequence of steps in accordance with this invention for testing the communication network of FIG. 2 as described above. More specifically, FIGS. 3 and 5 show an illustrative sequence of steps processed at switch 40 while FIG. 4 shows an illustrative sequence of steps processed at SD 10. To some extent, these steps have already been mentioned and so the discussion of them here can be somewhat abbreviated.

In step 110, an operations personnel using operations interface 60 connected to switch 40 input the data to begin a test query. The operations personnel also enters commands to control switch 40 via operations interface 60. Alternatively, switch 40 may be accessed remotely via a data network by an operations system (OS).

A template including shells of test queries is available so that an operation personnel may just change parameters and enter necessary data to modify an already existing test query instead of creating a new test query. The types of data to be entered may include a calling party number, receiving network element to be tested, or value of the timer provided to time a response to the test query.

For example, the operations personnel can indicate whether he wants the response of the TCAP output information in a raw binary and hexadecimal format or a readable English format. For example, the TCAP output information may contain a SD query response in a hexadecimal representation, and the SP destination in a hexadecimal representation. Alternatively, the operation personnel may request the TCAP response to be presented by switch 40 in a readable English format back to the operations personnel.

The types of the parameters that may be entered to formulate the test query include a called party number (dialed number), originating station type, data rate related to a call, carrier selection such as AT&T, trunk subgroup service type such as a long distance service, match restriction indication, and authorization code.

In step 112, after the operations personnel completes inputting the data, switch 40 evaluates whether it has sufficient internal system resources to run the test query. If switch 40 concludes that internal system resources are not sufficient to run the test query, switch 40 in step 114 reports back to the operations interface 60 an error message indicating a lack of resources.

If not, switch 40 in step 116 counts the number of tests that are currently and simultaneously running and determines whether the new test query can be run in addition. If the number of tests that are currently running exceeds the maximum threshold number that resources can handle, switch 40 in step 118 reports back to operations interface 60 that there are too many tests that are currently running.

If not, the SD test query in step 120 is populated with the input information from operations interface 60. In step 122, switch 40 searches the SD routing table located within switch 40 which tracks and stores the availability status of SD's in the network. For example, the SD routing table may categorize the SD's into a primary, secondary, and default SD's, all of which are fully replicated databases containing the same information.

In step 124, the operations personnel has an option to specify a particular SD as a receiving network element to send the test query. If the operations personnel decides to specify a particular SD, SD would be selected in step 126 where point code (PC) and subsystem number (SSN) identifies the address of the selected SD 10 and switch 40 creates a SD query.

If not, the operations personnel in step 128 has another option to send the SD test query to all SD's so that all of replicated SD's would be tested. If the operations personnel decides to select all SD's, switch 40 in step 130 creates an SD query test to each of SD's utilizing their PC's and SSN's.

If not, the operations personnel has an option to have any of SD's available at the time of querying to be tested. If the operations personnel selects any SD for testing, switch 40 in step 132 picks one SD arbitrarily from the pool of available SD's and creates a SD test query with PC or SSN of that SD. Alternatively, switch 40 selects a default SD to send a test query to and creates a SD test query in step 134 with the PC or SSN of the default SD.

In step 136, switch 40 determines whether the SD or SD's that have been specified through steps 126, 130, and 134 are accessible from switch 40. If switch 40 determines that no SD is available because the selected SD or SD's are not accessible via SS7 links, or due to network management controls, then switch 40 in step 138 reports to operations interface 60 an error indicating SD's unavailability.

In step 140, switch 40 assigns both transaction identification (TID) and correlation identification (CID) to the SD test query. The TID is used to associate a specific transaction between switch 40 and SD 10 with the SD test query so that switch 40 would be able to identify the response to the SD test query. The CID is implicitly included within the SP test query. The CID is, therefore, used to associate the SD test query with the call so that switch 40 would be able to identify the response from SP 50.

If switch 40 determines that there is any SD available switch 40 in step 142 starts a SD response timer. The SD response timer expires at a predetermined period of time from the point when the SD test query is sent out.

In step 144, switch 40 sends out a SD test query to selected SD's via appropriate STD's.

In step 210, SD 10 receives a SD query transmitted from switch 40. SD 10 determines in step 212 whether the received SD query is a test query or a normal network query. The presence of the SD test information parameter is used by SD 10 to determine if the received query is a test query. If SD 10 determines that the query is not a test query, SD 10 in step 214 performs a normal application processing for the call.

If SD 10 determines that the received query is a test query, SD 10 in step 216 takes all parameters in the test query, and searches through the SD routing tables located at SD 10 such as a dialed number table and calling party number table for matches of parameters to a service. SD 10 processes the test query as if it were a normal network query for the application supported, using information in the test query message.

In step 218, SD 10 determines whether any processing error has been detected. If there is a processing error, SD 10 in step 220 returns to switch 40 a message indicating the processing error.

If not, SD 10 determines in step 222 whether the received call is a featured call. If SD 10 determines that the call is not a featured call, SD 10 in step 224 creates a SD test response to switch 40 indicating that the call is a non-featured call and that the call should be routed with existing information available to switch 40. No query is sent to any of SP's since a non-featured call does not involve SP's and there is no SP to test.

If the call is a featured phone call, the call requires external application processing. SD 10 in step 226 determines whether operations interface 60 has provided for the SP destination to be a specific SP or any available SP. For example, there may be both a primary NCP and a secondary NCP. If the operations personnel has designated the primary NCP as the service processor to be tested and if there is a match on the SD test query to that NCP, then an SP test query is routed to the primary NCP. If operations interface 60 has provided for the SP destination to be any SP, SD 10 in step 228 selects either the first SP that is available or selects one SP arbitrarily from the SP table.

If SD 10 determines that the SP is specified already by operations interface 60, SD 10 at step 230 selects such specified SP. SD 10 in step 232 looks up the selected SP 50 in the SP routing table and determines whether the selected SP 50 is included in the SP routing table. If SP 50 is not found in the SP table, SD 10 concludes that there is an error and that the SP is out of the range of the SPs in the table. In step 234, SD 10 creates a SD test response indicating that SP 50 is out of range.

If SP 50 is found in the SP routing table, SD 10 in step 236 determines whether SP 50 is available based on the SS7 management status or application management status (e.g., no application overload controls applicable on this message), from the perspective of SD 10, i.e. whether SP 50 is accessible by SD 10. If SP 50 is not available, SD 10 in step 238 creates a response to switch 40 indicating the unavailability of SP 50 and instructing switch 40 to search its own database for the availability of SP 50.

If SD 10 determines that SP 50 is available, SD 10 in step 240 creates an appropriate SP test query to test functions of the network for the featured call. SD 10 in step 242 also creates a SD test response to return to switch 40 instructing switch 40 to wait for the SP test response.

In step 244, SD 10 sends out via appropriate SS7 routes all the messages to appropriate network elements in the network. The messages include a SD test response and SP test query.

In step 310, switch 40 waits for the SD test response from SD 10. During the interim between the transmission of the SD test query and the SD test response, switch 40 in step 312 determines whether there has been a TCAP error detected. The TCAP error is a network application error that occurred on the connection between SD 10 and switch 40. For example, a TCAP error occurs when a transaction cannot be identified. If such TCAP error occurs, switch 40 in step 314 reports the error to operations interface 60.

In step 316, switch 40 determines whether the time for the SD test response has expired. If the SD test timer has timed out before the SD test response comes back, switch 40 in step 318 reports to operation interface 60 an error indicating the SD test response timeout.

In step 320, switch 40 determines whether the response to the SP test query has been received prior to the response to the SD test query. If the SP test response has been received prematurely before the SD test response, switch 40 in step 322 reports to operation interface 60 an error. Such error may occur if a large number of queues has been built up for the SD test responses.

In step 324, switch 40 receives and processes a SD test response from SD.

In step 326, switch 40 determines whether the SD test response received from SD includes an instruction to wait for a SP test response. If the instruction from SD 10 is the wait instruction, switch 40 reports the result of the SD test response to operations interface 60 in step 328.

If not, switch 40 in step 330 determines whether the response received from SD 10 includes an instruction to create a SP test query because SP 50 is unavailable from SD's perspective due to, for example, failed links between SP 50 and SD 10. If the instruction is this query instruction, switch 40 reports the result of SD test response to operations interface 60 in step 332 and creates a SP test query.

Switch 40 in step 334 determines whether SP 50 is available from the perspective of switch 40 by searching through the database in switch 40. If SP 50 is not available, switch 40 in step 336 reports the unavailability of SP 50 to operations interface 60. If SP 50 is available, switch 40 in step 340 creates a SP test query and sends the query to SP 50 via STP's.

If the instruction is not a query instruction in step 336, switch 40 reports the SD test response to operations interface 60 in step 338. Such test response may indicate that the call does not involve any service processor and the call can be routed based on the existing information as discussed above. The reporting of errors in steps 114, 118, 138, 220, 234, 314, 318, 332, and 336, on the other hand, terminate the test process while reporting the error in processing and routing for tested network applications.

In step 340, switch 40 starts the timer for the response to SP query test. The timer starts in both cases where the SP test query is created at SD 10 or switch 40.

In step 342, switch 40 determines whether it has received any additional response to SD test query. If switch 40 receives an additional response to SD test, switch 40 loops back to step 324.

If not, switch 40 in step 344 waits for the response to the SP test query. Switch 40 in step 346 determines whether the timer expires before switch 40 receives the SP test response. If the SP test response timer expires, switch 40 in step 348 reports to operations interface 60 an error indicating that a specified waiting time ran out before receiving the response to the SP test query.

If not, switch 40 in step 350 receives the response to the SP test query and reports the test result to operations interface 60 in step 352.

In step 354, switch 40 determines whether it is waiting for any additional SP test response. If switch 40 receives any additional response to a SP test query, switch 40 loops back to step 344.

If not, switch 40 ends the test process in step 356 and closes the correlation ID.

The order of some of the steps in FIGS. 3–5 is not critical. For example, the order of steps 124, 128, and 132 (in which the switch 40 prompts the operations personnel to choose among different options) can be in any combination.

Figure 6:
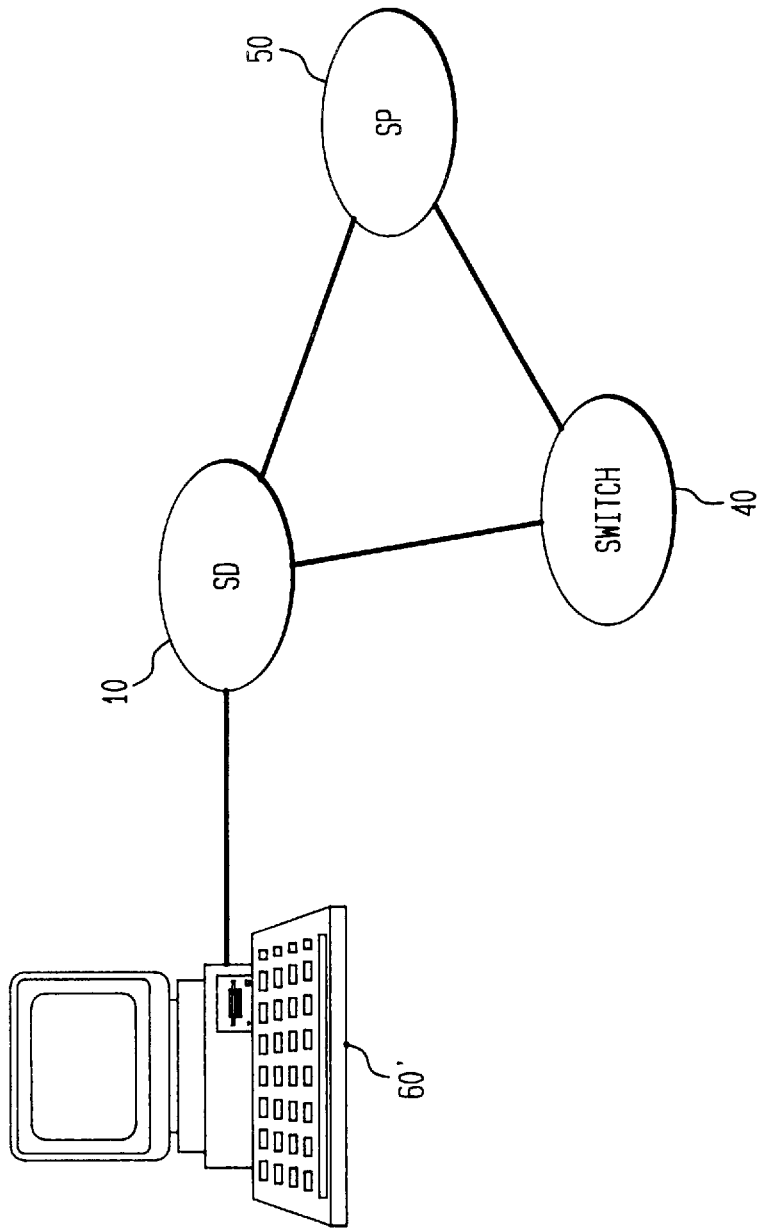
FIG. 6 is a view similar to FIG. 2 showing an alternative illustrative network which can be tested in accordance with this invention.

FIG. 6 shows an alternative illustrative network which can be tested with the methods of the present invention. FIG. 6 is similar to FIG. 2 except that FIG. 5 has operations interface 60' connected to SD 10 instead of switch 40. Thus FIG. 6 expressly shows the type of an overall network in which the operations personnel utilizing operations interface 60' can test SP 50 from the site of SD 10.

Figure 7A:
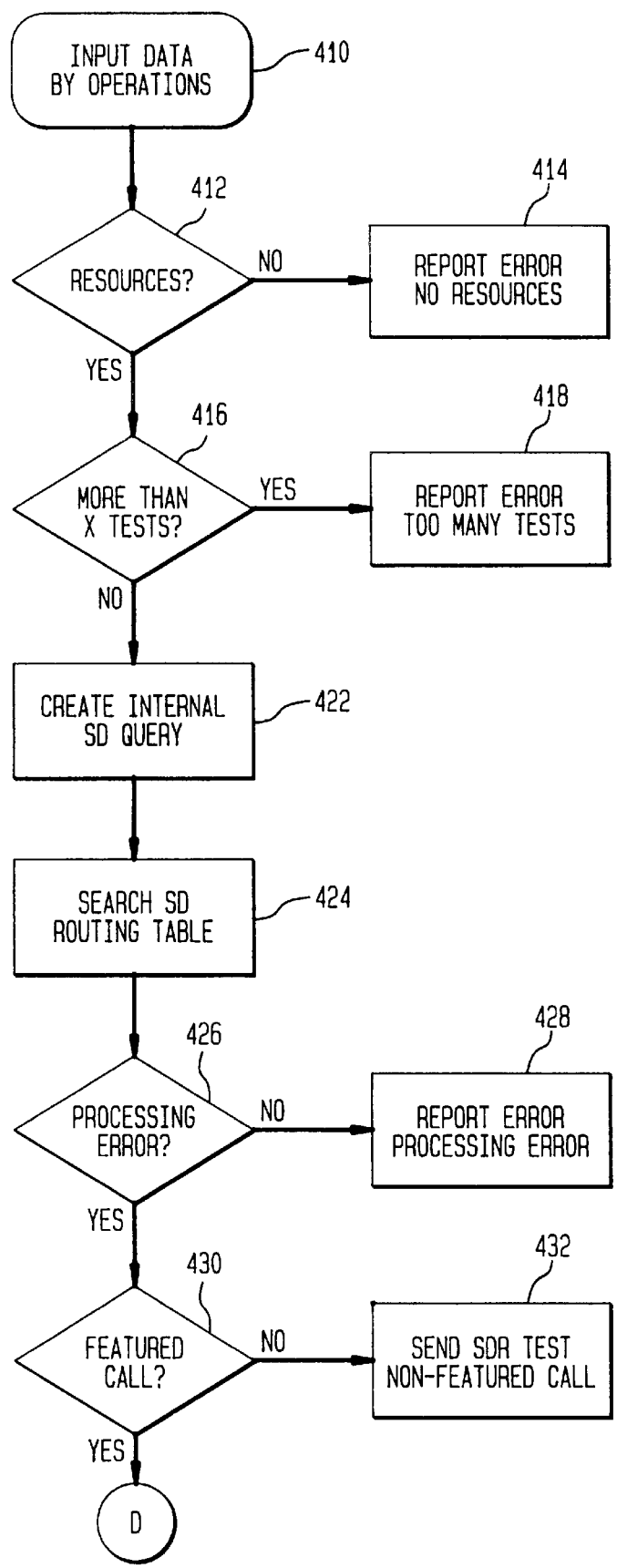
FIGS. 7a–c (collectively referred to as FIG. 7) are a flow chart of steps for carrying out another illustrative embodiment of the methods of this invention.
Figure 7B:
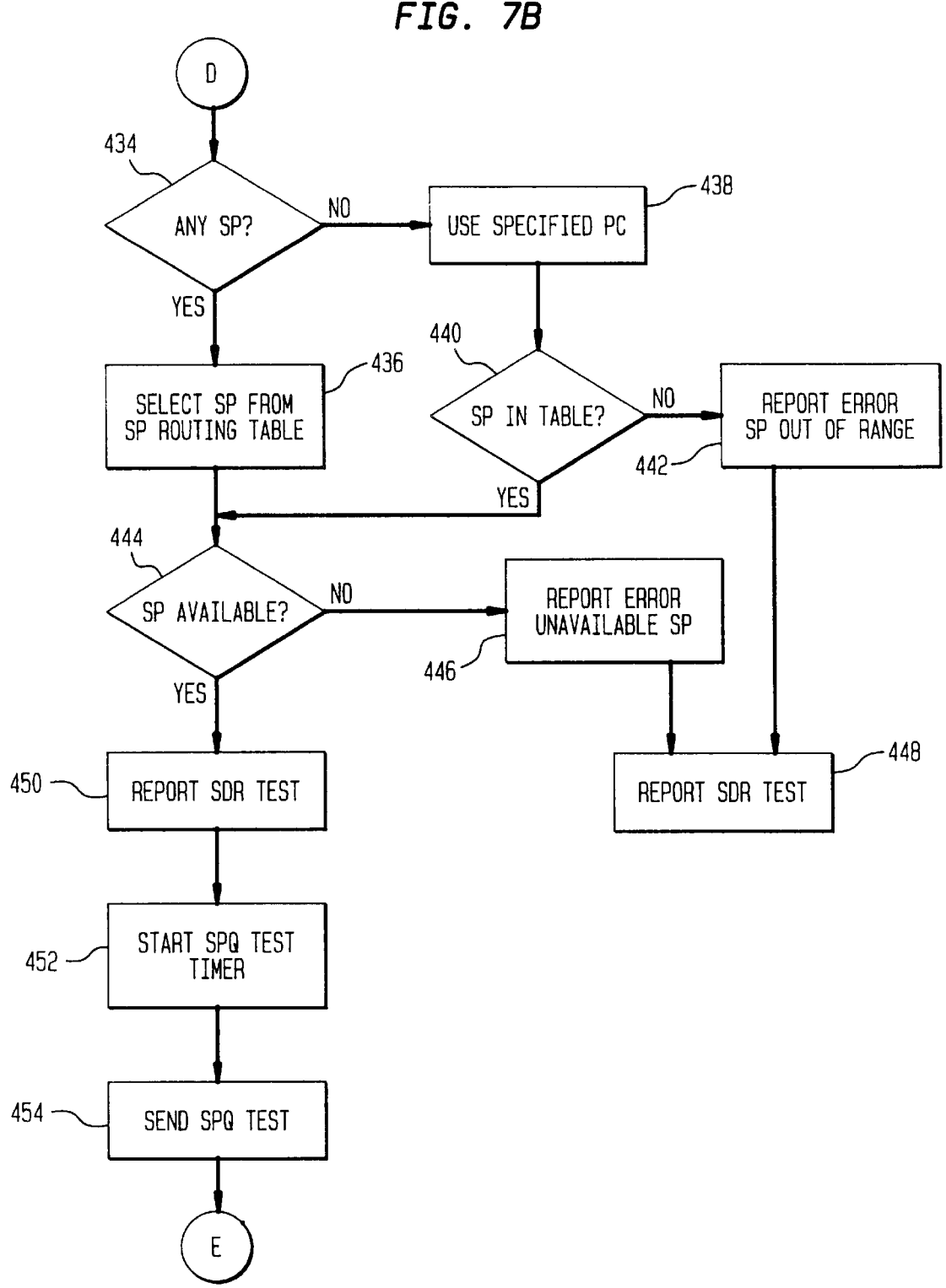
Figure 7C:
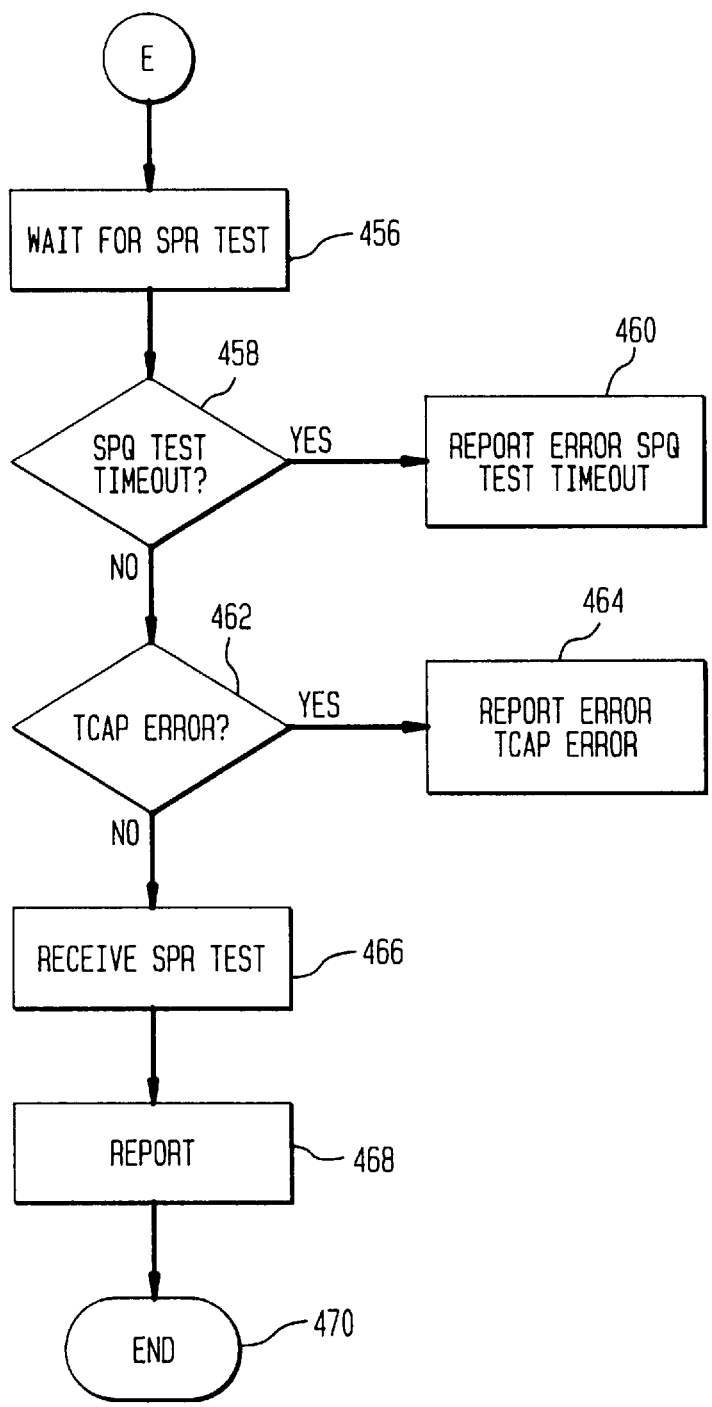

FIG. 7 shows adaptation of the method of FIGS. 3–5 to a network of the type shown in FIG. 6. Many of the steps in FIG. 7 are the same as or similar to steps in FIGS. 3–5. Thus, the discussion of many of the steps in FIG. 7 can be somewhat abbreviated because more extensive discussion has already been provided for corresponding steps in FIG. 2.

In step 410, the operations personnel input data via operations interface 60'. The input data is basically the same as in step 210 except that the operations personnel would not input information about the SD selection or SD test query timer.

Steps 412, 414, 416, and 418 are respectively similar to steps 212, 214, 216, and 218 in FIG. 3 and therefore do not need to be described here.

If SD 10 determines that it has sufficient internal resources to run a test query under the current condition in steps 412 and 416, SD 10 creates an internal SD query in step 422.

The internal SD query is a pseudo-SD test query since the request for the test is generated over operation interface 60' instead of switch 40. Thus, SD 10 generates an SD test query that is used internally to search its own SD tables in step 424. Therefore no SD test response involves SS7 network. Instead, the information in response to the SD test query is returned to operations interface 60'.

Subsequently, SD 10 processes steps 426–448 The steps 426–448 are respectively similar to steps 218–238 in FIG. 4, and therefore do not need to be described here.

If SP 50 is available, SD 10 in step 450 reports to operations interface 60' the SD test response. In step 452, SD 10 starts the SP test response timer that expires after a predetermined period of time from the point SD 10 sends out the SP test query. In step 454, SD 10 sends out the SP test query to SP 50 via the SS7 network. Subsequently, SD 10 processes the rest of steps 356–470. The steps 456–470 are respectively similar to steps 344–356 in FIG. 5 except that the site for processing the steps in FIG. 5 is switch 40 while the site for processing the steps in FIG. 7 is SD 10, and therefore do not need to be described here.

As in FIG. 5, the results of test queries include any SD test query, SD test response, SP test query, SP test response or TCAP information if available are reported to the operations personnel in either readable English text or raw hexadecimal format. The result may also indicate whether the application's processing and routing has passed or failed the test. The message may also include the addressee of SD and SP in a point code (PC) of subsystem number (SSN). The results of the test queries, therefore, provide various indicators for measuring usefulness of the provisioned data and reliability of the functionality of the elements in the network.

It will be understood that the foregoing is only illustrative of the principles of the invention and that various modifications can be made by those skilled in the art without departing from the scope and spirit of the invention.

The invention claimed is:

1. A method of testing provisioned data and functionality of a network comprising the steps of:
   under the guidance and control of an operations personnel, populating information for a first test query at an originating network element;
   under the guidance and control of an operations personnel, specifying at least one receiving network element to be queried;
   constructing said first test query based on said information;
   sending said first test query from said originating network element to said at least one receiving network element;
   processing said first test query at said at least one receiving network element as if said first test query is an actual network query;
   integrating a first test response; and
   sending first test response from said at least one receiving network element to said originating network element; and
   providing said first test response to said operations personnel for analysis of the accuracy of said provisioned data and network functionality.

2. The method defined in claim 1, wherein said processing step requires at least one additional network element to be queried, further comprising the steps of:
   constructing a second test query at said at least one receiving network;
   sending said second test query to said at least one additional network element;
   processing said second test query at said at least one additional network element as if said second test query is an actual network query;
   integrating a second test response;
   sending said second test response from said at least one additional network element to said originating network element; and
   providing said second test response to said operations personnel for analysis of the accuracy of said provisioned data and network functionality.

3. The method defined in claim 2, further comprising the steps, in combination, of:
   detecting an error condition during said steps of sending said first or second test query or said steps of processing said first or second test query;
   terminating testing upon the occurrence of said error condition detection; and
   reporting said detected error condition to said operations personnel.

4. The method defined in claim 1 further comprising the steps of:
   receiving said information from said operations personnel via an operations interface connected to said originating network; and
   reporting said first test response to said user via said operations interface.

5. The method defined in claim 4, further comprising the steps, in combination, of:
   detecting an error condition during said step of sending said first test query or said step of processing said first test query;
   terminating testing upon the occurrence of said error condition detection; and
   reporting said detected error condition to said operations personnel via said operations interface.

6. The method defined in claim 1 wherein said at least one receiving network element is said originating network element.

7. The method defined in claim 6 wherein said first test query is processed as if said first test query is received from a geographically separated originating network.

8. The method defined in claim 1, further comprising the steps, in combination, of:
   detecting an error condition during said step of sending said first test query or said step of processing said first test query;
   terminating testing upon the occurrence of said error condition detection; and
   reporting said detected error condition to said operations personnel.

9. A method of testing provisioned data and functionality of a network comprising the steps of:
   under the guidance and control of an operations personnel, populating information for a first test query at an originating network element;
   under the guidance and control of an operations personnel, specifying at least one first network element to be queried;
   creating said first test query based on said information; and
   sending said first test query to said at least one first network element as if said test query is an actual network query.

10. The method defined in claim 9 further comprising the steps of:
   receiving at said at least one first network element said first test query;
   processing said first test query to integrate a first test response;
   sending said first test response to said originating network element;

receiving at said originating network element said first test response; and providing said first test response to said operations personnel for analysis of the accuracy of said provisioned data and network functionality.

11. The method defined in claim 10 wherein said processing step requires a second test query to at least one second network element, further comprising the steps of:

constructing said second test query; and sending said second test query to said at least one said second network element.

12. The method defined in claim 11 further comprising the steps of:

receiving said second test query at said second network element;

processing said second test query to integrate a second test response;

sending said second test response to said originating network element;

receiving at said originating network said second test response; and providing said second test response to said operations personnel for analysis of the accuracy of said provisioned data and network functionality.

13. The method defined in claim 10, further comprising the steps, in combination, of:

detecting an error condition during said steps of sending or receiving said first test query or said step of processing said first test query;

terminating testing upon the occurrence of said error condition detection; and reporting said detected error condition to said operations personnel.

14. A test query method of testing provisioned data and functionality of a network comprising the steps of:

under the guidance and control of an operations personnel, providing information for a database query, said information including the specification of at least one database for testing;

receiving at a switch said information provided by said operations personnel for a database test query from an operations interface;

processing said information to locate said at least one database;

constructing said database test query based on said information; and sending said database test query from said switch to said at least one database as if said test query is an actual network query.

15. The method defined in claim 14 further comprising the steps of:

receiving at said at least one database said database query;

processing said database test query with provisioned data to locate at least one service processor and integrate a database test response;

constructing a service processor test query;

sending said service processor test query to said at least one service processor;

sending said database test response to said switch; and providing said database test response to said operations personnel for analysis of the accuracy of said provisioned data and network functionality.

16. The method defined in claim 15 further comprising the steps of receiving at said at least one service processor said service processor test query;

processing said service processor test query with provisioned data to integrate a service processor test response;

sending said service processor test response to said switch; and providing said service processor test response to said operations personnel for analysis of the accuracy of said provisioned data and network functionality.

17. The method defined in claim 16 further comprising the steps of:

receiving at said switch a database response;

receiving at said switch a service processor response; and reporting said responses from said switch to said operations personnel via said operations interface.

18. The method defined in claim 17 wherein said step of reporting said detected error condition to said operations personnel is performed via said operations interface.

19. The method defined in claim 16, further comprising the steps, in combination, of:

detecting an error condition during said steps of sending or receiving said service processor test query or said step of processing said service processor test query;

terminating testing upon the occurrence of said error condition detection; and reporting said detected error condition to said operations personnel.

20. The method defined in claim 15, further comprising the steps, in combination, of:

detecting an error condition during said steps of sending or receiving said database test query or said step of processing said database test query;

terminating testing upon the occurrence of said error condition detection; and reporting said detected error condition to said operations personnel.

21. A test query method of testing provisioned data and functionality of a network comprising the steps of:

receiving at a switch information for a database test query from an operations interface;

processing said information to locate at least one database;

constructing said database test query based on said information;

sending said database test query from said switch to said at least one database as if said test query is an actual network query;

receiving at said at least one database said database query;

processing said database test query with provisioned data to locate at least one service processor and integrate a database test response;

constructing a service processor test query;

sending said service processor test query to said at least one service processor;

sending said database test response to said switch;

receiving at said at least one service processor said test query;

processing said service processor test query with provisioned data to integrate a service processor test response;

sending said service processor test response to said switch; and reporting an error to said operations interface if said database test response is received prior to said service processor test response.

22. The method defined in claim 21, further comprising the steps, in combination, of:

detecting an error condition during said steps of sending or receiving said database test query, said steps of sending or receiving said service processor test query or said steps of processing said database or said service processor test queries;

terminating testing upon the occurrence of said error condition detection; and reporting said detected error condition to said operations personnel.

23. A method of testing provisioned data and functionality of a network comprising the steps of:

under the guidance and control of an operations personnel, populating information for a test query at an originating network element;

under the guidance and control of an operations personnel, specifying at least one service processor to be queried;

under the guidance and control of an operations personnel, constructing said test query based on said information;

sending said test query to said service processor as if said test query is an actual network query; and receiving a response to said test query from said service processor; and providing said response to said operations personnel for analysis of the accuracy of said provisioned data and network functionality.

24. The method defined in claim 23 wherein said originating network element is a database for identifying said at least one service processor based on call setup information.

25. The method defined in claim 23 further comprising the steps of:

receiving information from said operations personnel via an operations interface; and reporting said response to said operations personnel via said operations interface.

26. The method defined in claim 25, further comprising the steps, in combination, of:

detecting an error condition during said steps of sending or receiving said test query or said step of processing said test query;

terminating testing upon the occurrence of said error condition detection; and reporting said detected error condition to said operations personnel via said operations interface.

27. The method defined in claim 23 wherein said step of constructing includes the step of accompanying said test query with an identification code for associating said response to said test query.

28. The method defined in claim 23 wherein said service processor is a network control point in said network.

29. The method defined in claim 23 further comprising the steps of:

processing said information to determine availability of said at least one service processor for said selecting step; and terminating said test query if said at least one service processor is not available.

30. The method defined in claim 23 further comprising the steps of:

starting a timer when said service processor test query is sent out; and terminating said test query if said timer expires prior to a receipt of said response.

31. The method defined in claim 23 further comprising the steps of:

detecting a network error; and terminating said test query if said network error is detected.

32. The method defined in claim 23 further comprising the steps of:

evaluating availability of network resources to run said test query; and terminating said test query if said network resources are not sufficient.

33. The method defined in claim 23, further comprising the steps, in combination, of:

detecting an error condition during said steps of sending or receiving said test query or said step of processing said test query;

terminating testing upon the occurrence of said error condition detection; and reporting said detected error condition to said operations personnel.

* * * * *